United States Patent
Chou et al.

(10) Patent No.: US 10,308,006 B2
(45) Date of Patent: Jun. 4, 2019

(54) METHOD FOR CALIBRATING A LIGHT OF A THREE-DIMENSIONAL OBJECT GENERATING APPARATUS

(71) Applicants: XYZPRINTING, INC., New Taipei (TW); KINPO ELECTRONICS, INC., New Taipei (TW)

(72) Inventors: Ching-Yuan Chou, New Taipei (TW); Min-Hsiung Ding, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 502 days.

(21) Appl. No.: 15/070,102

(22) Filed: Mar. 15, 2016

(65) Prior Publication Data
US 2017/0100895 A1    Apr. 13, 2017

(30) Foreign Application Priority Data
Oct. 13, 2015   (CN) .......................... 2015 1 0669446

(51) Int. Cl.
| | |
|---|---|
| B29C 67/00 | (2017.01) |
| B33Y 50/02 | (2015.01) |
| B33Y 10/00 | (2015.01) |
| B29C 64/135 | (2017.01) |
| B29C 64/393 | (2017.01) |

(52) U.S. Cl.
CPC ............ B33Y 50/02 (2014.12); B29C 64/135 (2017.08); B29C 64/393 (2017.08); B33Y 10/00 (2014.12)

(58) Field of Classification Search
CPC .......................... B29C 64/135; B29C 64/393
See application file for complete search history.

(56) References Cited

U.S. PATENT DOCUMENTS

| | | | | |
|---|---|---|---|---|
| 5,430,666 | A  * | 7/1995 | DeAngelis | G05B 19/4015 250/491.1 |
| 6,483,596 | B1 * | 11/2002 | Philippi | G05B 19/4015 156/272.8 |
| 9,541,844 | B2 * | 1/2017 | Maguire | G03F 7/70416 |
| 2009/0051935 | A1 * | 2/2009 | Cooper | B23K 33/00 356/616 |
| 2010/0264302 | A1 * | 10/2010 | Philippi | B23K 26/046 250/252.1 |

* cited by examiner

*Primary Examiner* — James Sanders
(74) *Attorney, Agent, or Firm* — Chun-Ming Shih; HDLS IPR Services (57) ABSTRACT

A method for calibrating light is adapted to a 3D object generating apparatus including a housing, an optical-transparent component, and a laser light generator. The housing has an accommodating space and an opening communicating with the accommodating space. The optical transparent component is arranged on the opening, and the laser light generator is arranged within the accommodating space. The method includes the following steps: providing a first photodetector and a controller, the controller is electrically connected to the first photodetector and the laser light generator; using the controller to drive the laser light generator to generate the light and perform a scanning procedure; and stopping the scanning procedure when the first photodetector detects the light generated by the laser light generator, and then performing a 3D object generating procedure in the working region by moving the laser light generator with a preset distance.

5 Claims, 12 Drawing Sheets

METHOD FOR CALIBRATING A LIGHT OF A THREE-DIMENSIONAL OBJECT GENERATING APPARATUS

BACKGROUND OF THE INVENTION

Field of the Invention

The present disclosure relates to a method for calibrating an optical component. More particularly, the present disclosure relates to a method for calibrating a light of a three-dimensional (3D) object generating apparatus.

Description of Related Art

Stereolithography is a method and apparatus for making solid objects by successively printing thin layers of a curable material one on top of the other. A programmed movable spot beam of UV light shining on a surface or layer of UV curable liquid is used to form a solid cross-section of the object at the surface of the liquid. The object is then moved, in a programmed manner, away from the liquid surface by the thickness of one layer, and the next cross-section is then formed and adhered to the immediately preceding layer defining the object. This process continues until the entire object is formed.

In general, the light source configured to generate light for curing the fluid medium is positioned to make sure the light generated therefrom can precisely transmit to the locations where the 3D model information is defined.

However, the positioned light source of the 3D object generating apparatus may further shift during shipping, which causes the 3D object generating apparatus to be unable to generate the 3D object in accordance with the 3D model information.

SUMMARY OF THE INVENTION

According to one aspect of the present disclosure, a method for calibrating a light is adapted to a 3D object generating apparatus including a housing, an optical-transparent component, and a laser light generator. The housing has an accommodating space and an opening communicating to the accommodating space. The optical transparent component is arranged at the opening. The laser light generator is arranged at one side of the optical-transparent component and located within the accommodating space, and is employed to cure a fluid medium arranged at the other side of the optical-transparent component. The method includes following steps: providing a first photodetector and a controller, the controller is electrically connected to the first photodetector and the laser light generator; using the controller to drive the laser light generator to generate the light and perform a scanning procedure; and stopping scanning procedure when the first photodetector detecting the light generated by the laser light generator, and then performing a 3D object generating procedure in the working region by moving the laser light generator with a preset distance.

According to another aspect of the present disclosure, a method for calibrating a light of a 3D object generating apparatus adapted to a 3D object generating apparatus includes a housing, an optical-transparent component, and a laser light generator. The housing includes an accommodating space and an opening communicating with the accommodating space. The optical-transparent component is arranged on the opening, the laser light generator is arranged on one side of the optical-transparent component and within the accommodating space. The laser light generator is used for curing a fluid medium arranged on the other side of the optical-transparent component and in a working region. The method includes following steps: providing a first photodetector, a second photodetector, and a controller, wherein the controller is electrically connected to the first photodetector, the second photodetector, and the laser light generator, and a line for connecting the first photodetector and the second photodetector is parallel to a first axis; using the controller to drive the laser light generator to generate a linear light, wherein a length of the linear light in the first axis is larger than a length of the line for connecting the first photodetector and the second photodetector in the first axis; using the controller to make the linear light generated by the laser light generator transmit to one of the first photodetector and the second photodetector; using the controlling to move the laser light generator along a second axis and make the linear light transmit to the other one of the first photodetector and the second photodetector, wherein the second axis is perpendicular to the first axis; using the controller to obtain the moved distance of the laser light generator along the second axis and calculate an inclination of the laser light generator; and using the controller to calibrate the position of the laser light generator according to the inclination.

According to further another aspect of the present disclosure, a method for calibrating a light of a 3D object generating apparatus adapted to a 3D object generating apparatus comprising a housing, an optical-transparent component, and a laser light generator. The housing includes an accommodating space and an opening communicating with the accommodating space. The optical-transparent component is arranged on the opening, and the laser light generator is arranged on one side of the optical-transparent component and within the accommodating space. The laser light generator used for curing a fluid medium arranged on the other side of the optical-transparent component and in a working region. The method includes following steps: providing a first photodetector, a second photodetector, and a controller, wherein the controller is electrically connected to the first photodetector, the second photodetector, and the laser light generator, and a line for connecting the first photodetector and the second photodetector is parallel to a diagonal of the optical-transparent component; using the controller to drive the laser light generator to generate a surface beam and generate a scanning procedure, wherein the scanning procedure is performed by making the surface beam be projected to the first photodetector and the second photodetector; and using the controlling to calibrate the position of surface beam projected to the optical-transparent component according to the first signal sent from the first photodetector and the second signal sent form the second photodetector.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

FIG. 12 is a schematic view illustrating what an inclination is like;

DETAILED DESCRIPTION OF THE INVENTION

A preferred embodiment of the present invention will be described with reference to the drawings.

Figure 1:
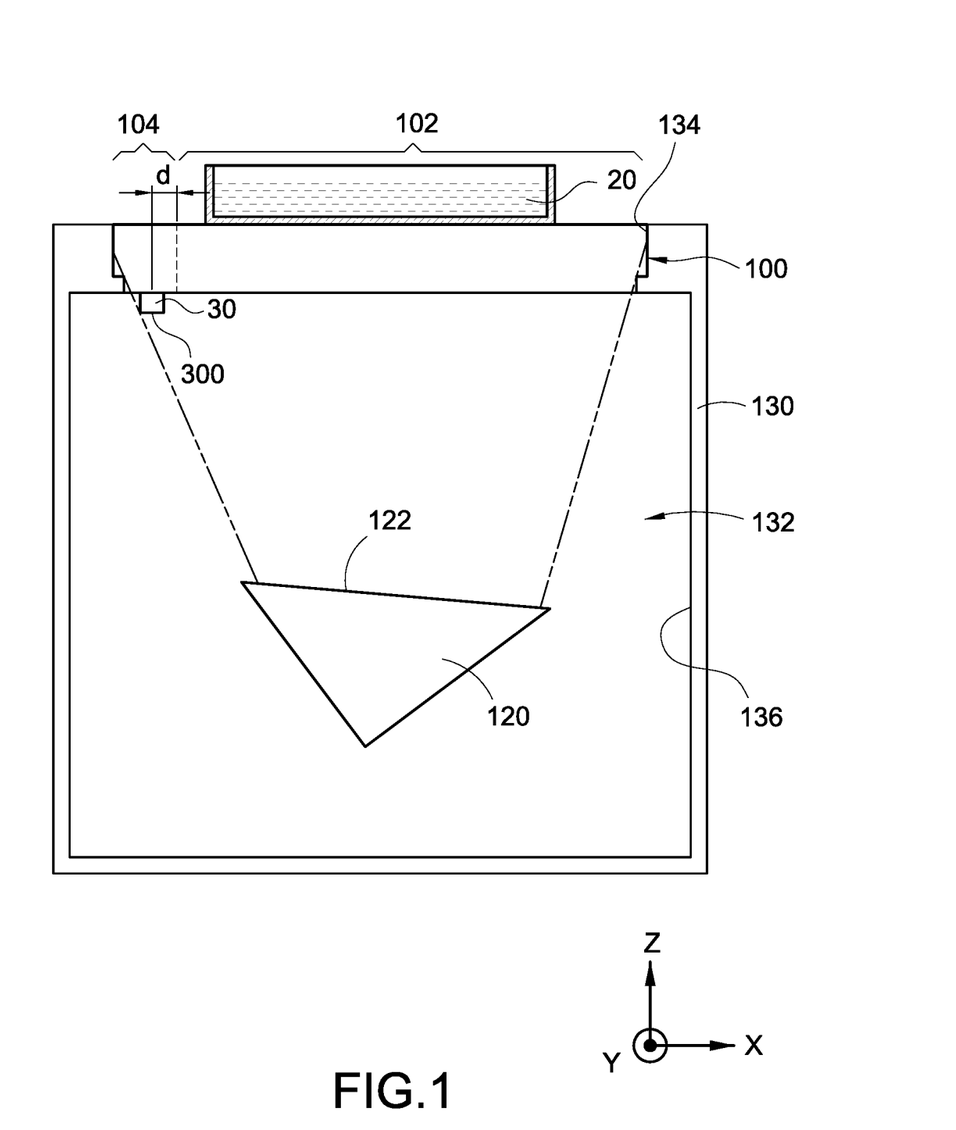
FIG. 1 is a schematic view of a part of components of a three-dimensional (3D) object generating apparatus according to a first embodiment of the present invention.

Reference is made to FIG. 1, which is a schematic view of a part of components of a three-dimensional (3D) object generating apparatus according to a first embodiment of the present invention. In FIG. 1, the 3D object generating apparatus includes an optical-transparent component 100 and a laser light generator 120. The laser light generator 120 and a container (its reference numeral is omitted) filled with a fluid medium 20 (such as photocurable resin) for producing the 3D object are arranged at opposite sides of the optical-transparent component 100. In this embodiment, the optical-transparent component 100 made of glass allows light generated by the laser light generator 120 passing therethrough and has a characteristic of dustproof. The 3D object generating apparatus 10 may further include an input unit (not shown) for receiving the 3D model information defining the 3D object, and the 3D object is generated within the fluid medium 20 which is selectively cured by spot beam of laser light emitted from the laser light generator 120 brought to selective focus prescribed by the 3D model information.

Figure 2:
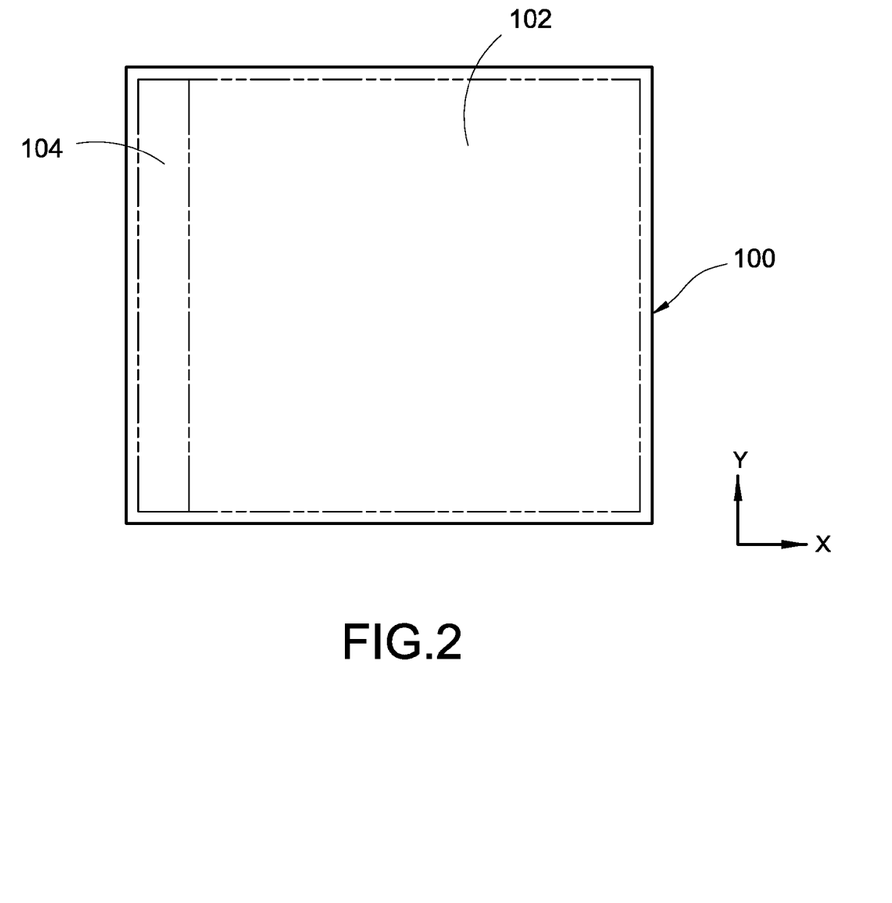
FIG. 2 is a top view of the optical-transparent component shown in the FIG. 1.

Reference is made to FIG. 2, the optical-transparent component 100 includes a working region 102 and a first calibrating region 104. The area of the working region 102 is, for example, larger than that of the first calibrating region 104. In FIG. 2, the optical-transparent component 100 is substantially of rectangular shape, and has a first axis X and a second axis Y perpendicular to the first axis X, and the first calibrating region 104 is arranged on the left side of the working region 102 in the first axis X.

With reference again to FIG. 1, the fluid medium 20 is arranged at one side of the optical-transparent component 100 and in the work region 102 and the laser light generator 120 is arranged at the other side of the optical-transparent component 100. The laser light generator 120 includes a light-emitting surface 122 facing the optical-transparent component 100. The spot beam of the laser light generated by the laser light generator 120 is not only transmitted to the work region 102 but also transmitted to the first calibrating region 104, and a 3D object generating procedure for generating the 3D object and a calibrating procedure for calibrating positions of the spot beam of the laser light generated by the laser light generator 120 are performed at different times. More particularly, the 3D object generating procedure is performed while the spot beam is transmitted to the work region 102, and the calibration procedure is performed while the spot beam is transmitted to the first calibrating region 104.

A first photodetector 30 is arranged on the optical-transparent component 100 and configured to detect the laser light emitted from the laser light generator 120. More particularly, the first photodetector 30 has a light detecting surface 300 facing the light emitting surface of the laser light generator 120. In FIG. 1, the first photodetector 30 and the laser light generator 120 are arranged at the same side of the optical-transparent component 100. The first photodetector 30 is arranged at the first calibrating region 104, wherein the length of the first calibrating region 104 in the first axis X is equal to or larger than that of the first photodetector 30 in the first axis X, and there is a preset distance d between a central axis of the first photodetector 30 and the work region 102. The first photodetector 30 is, for example, charge coupled device (CCD) or complementary metal-oxide-semiconductor (COMS) sensor.

Figure 3:
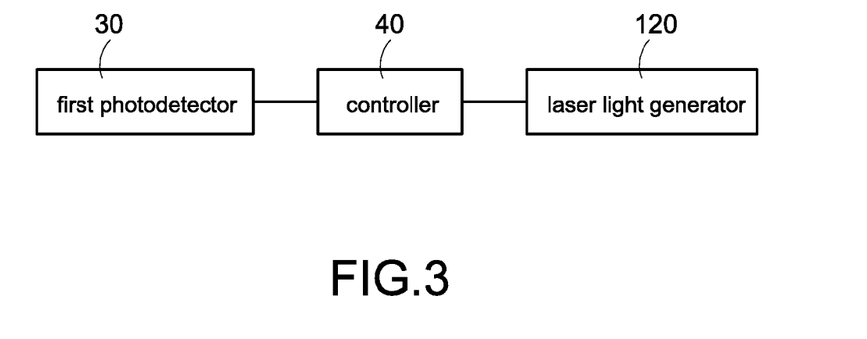
FIG. 3 is a circuit block diagram of the 3D object generating apparatus shown in FIG. 1.

The first photodetector 30 is electrically connected to the controller 40, as shown in FIG. 3, and the controller 40 is also electrically connected to the laser light generator 120. The controller 40 receives a first signal sent from the first photodetector 30 and controls the operations of the laser light generator 120 (such as the positions of the spot beam of the laser light emitted therefrom) according to the first signal.

The calibrating procedure starts with driving the laser light generator 120 to generate the spot beam by a controller 40. The controller 40 further drives the laser light generator 120 to perform the scanning procedure by positioning the spot beam generated by the laser light generator 120 across the optical-transparent component 100. The scanning procedure is continuously performed until the light reaches the first photodetector 30. More particularly, the laser light generator 120 can continuously or discontinuously emit light when the scanning procedure is performed, and the scanning procedure can only be performed across the first calibration region 104.

The controller 40 makes the laser light generator 120 stop preforming scanning procedure when the spot beam generated by the laser light generator 120 reaches the first photodetector 30. After that, the spot beam of the laser light generator 120 is controlled to move the preset distance d by the controller 40, and then the 3D object generating procedure can be precisely performed in the working region 102.

In the present invention, the scanning procedure positioning the spot beam generated by the laser light generator 120 is performed before performing the 3D object generating procedure, therefore the spot beam generated by the laser light generator 120 can precisely project to the working region 102 and generate 3D object according to the 3D model information.

Figure 4:
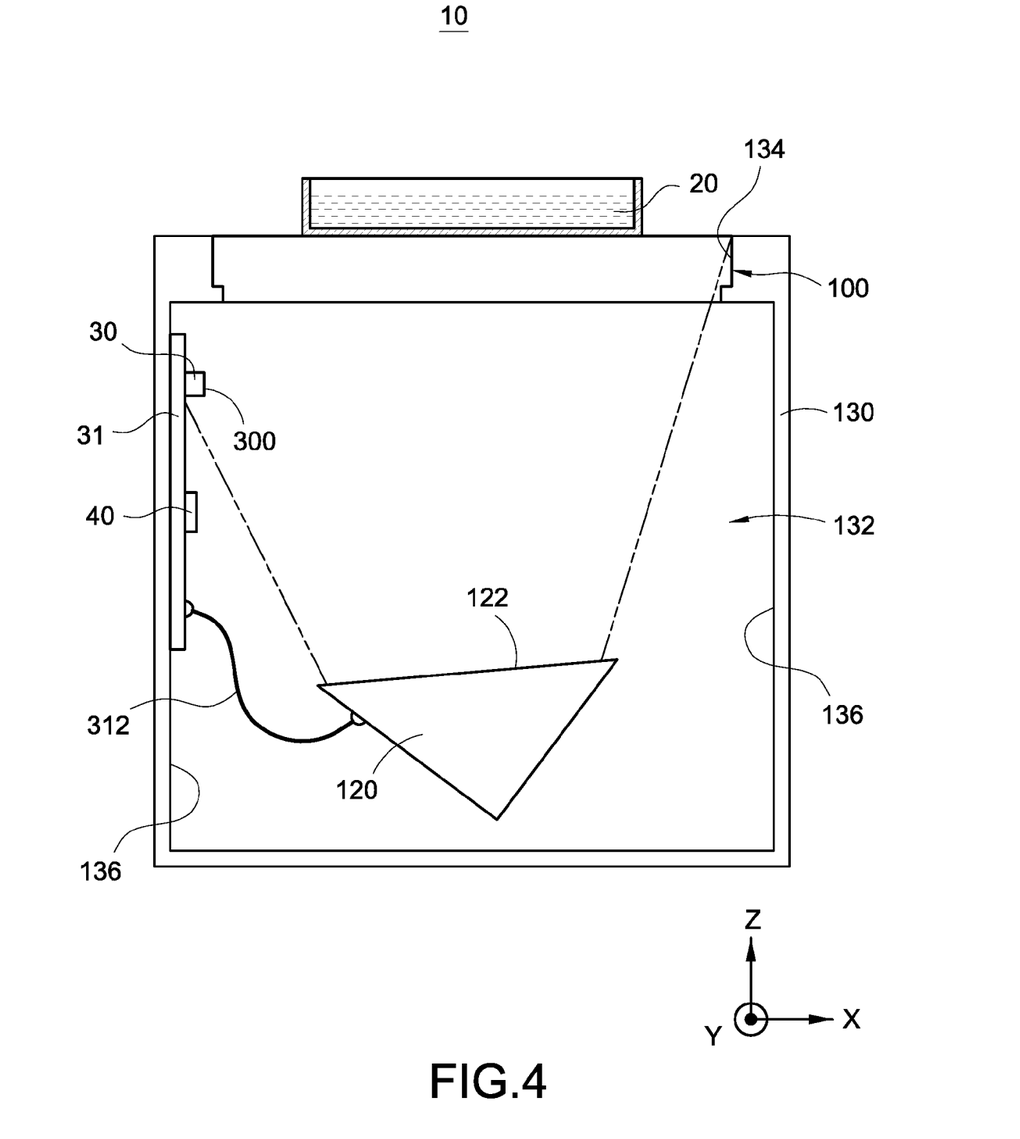
FIG. 4 is a schematic view of a part of components of a 3D object generating apparatus according to a second embodiment of the present invention.

Reference is made to FIG. 4, which is a part of components of a 3D object generating apparatus according to a second embodiment of the present invention. In FIG. 2, the 3D object generating apparatus 10 includes an optical-transparent component 100, a laser light generator 120, and a housing 130. The housing 130 includes an accommodating space 132 and an opening 134 communicating with the accommodating space 132. The optical-transparent component 100 is arranged on the opening 134, a container (its reference numeral is omitted) filled with a fluid medium 20 for producing the 3D object is arranged at one side of the optical-transparent component 100, and the laser light generator 120 is arranged at the other sider thereof. More particularly, the laser light generator 120 is located within the accommodating space 132.

In FIG. 4, a first photodetector 30, such as phototransistor, CCD, or COMS sensor, is arranged on the housing 130 and near the optical-transparent component 100. The first photodetector 30 is configured to detect spot beam generated by the laser light generator 120. The first photodetector 30 is, for example, mounted on a circuit board 31 arranged on an inner surface 136 of the housing 130, thus the movable angle of the laser light generator 120 in the scanning procedure can be reduced, and advantages of convenience and accuracy are then provided. The first photodetector 30 is electrically connected to the controller 40, and the controller 40 is further electrically connected to the laser light generator 120 via conducting wire 312.

The controller 40 makes the laser light generator 120 generate spot beam and controls the position of the spot beam projecting to the fluid medium while the scanning procedure is performed. The controller 40 further makes the laser light generator 120 stop preforming scanning procedure when the spot beam reaches the first photodetector 30, and the 3D object generating procedure is performed after the controller 40 makes the spot beam move the preset distance d (from the first calibrating region 104 to the working region 102) by positioning the laser light generator 120.

Figure 5:
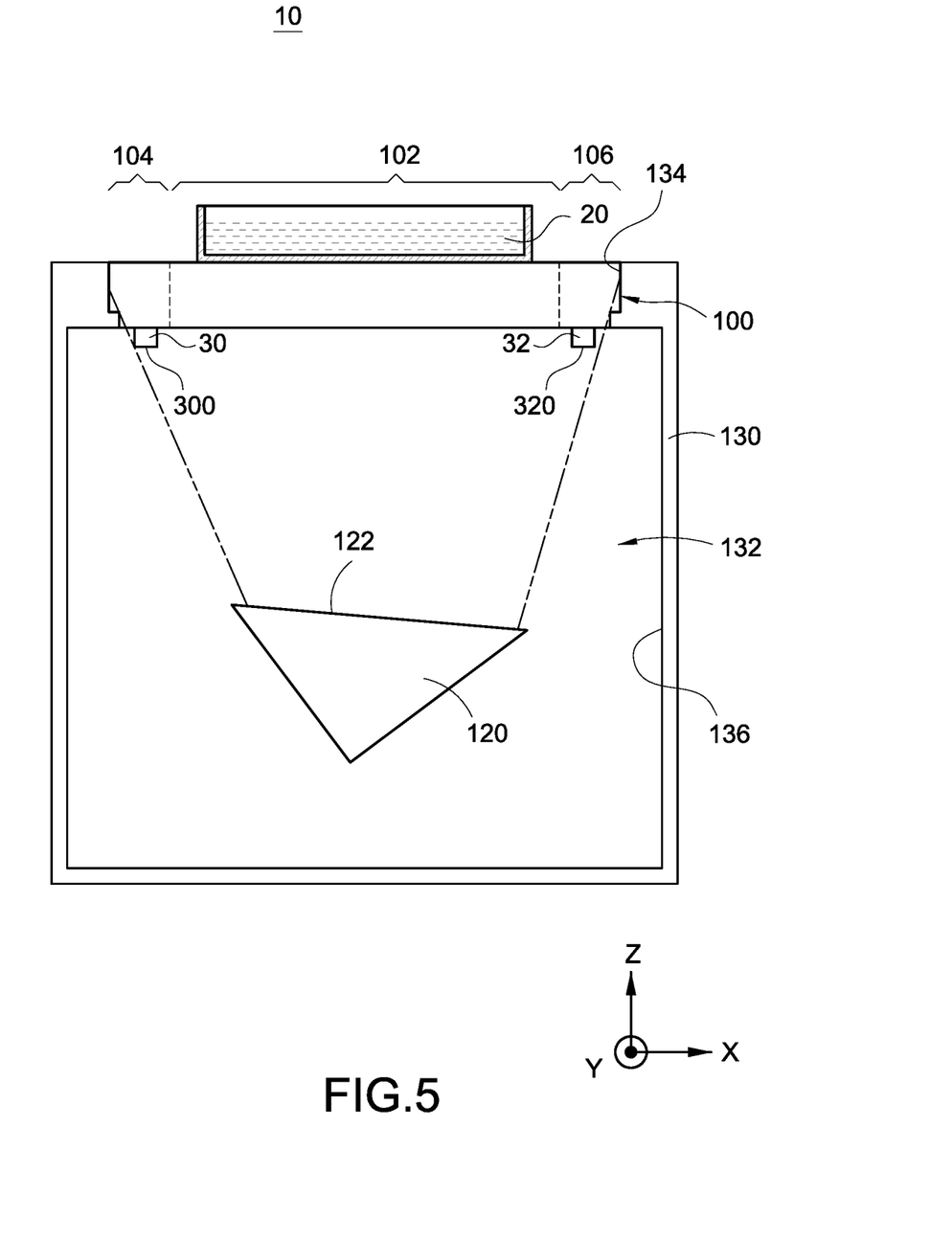
FIG. 5 is schematic view of a part of components of a 3D object generating apparatus according to a third embodiment of the present invention.

Reference is made to FIG. 5, which is a schematic view of a part of components of a 3D generating apparatus according to a third embodiment of the present invention. In FIG. 5, the 3D object generating apparatus 10 includes an optical-transparent component 100, a laser light generator 120, and a housing 130. A container (its reference numeral is omitted) filled with a fluid medium 20 for producing the 3D and the laser light generator 120 are arranged at the opposite sides of the optical-transparent component 100. The laser light generator 120 for generating the laser light has a light emitting surface 122 facing the fluid medium 20, and the laser light is projected to the fluid medium 20 for curing the fluid medium 20. The housing 130 has an accommodating space 132 and an opening 134 communicating with the accommodating space 130, the optical-transparent component 100 is arranged on the opening 100.

Figure 6:
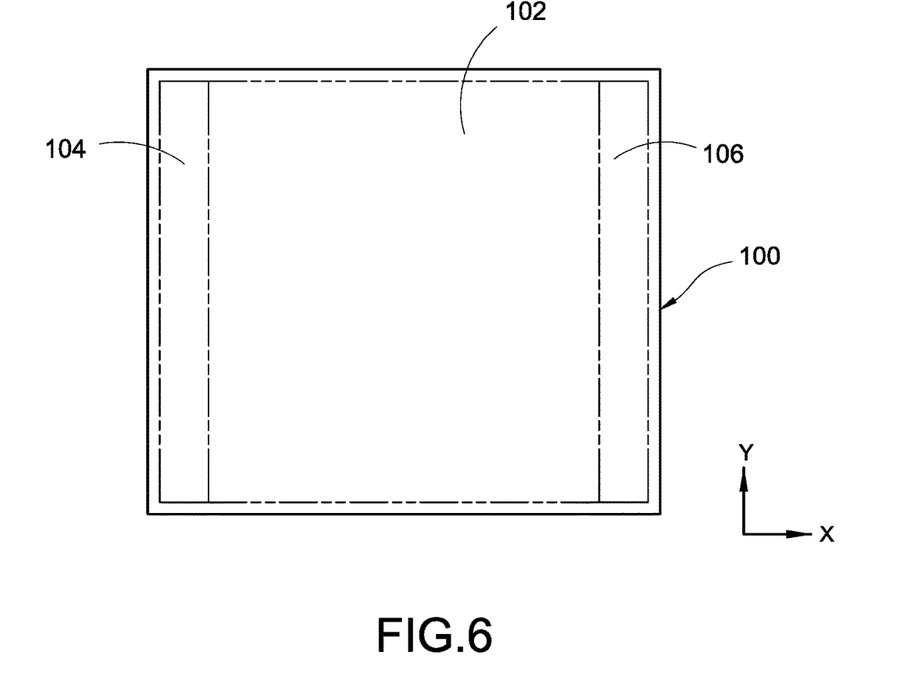
FIG. 6 is a top view of the optical transparent component shown in the FIG. 5.

Reference is made to FIG. 6, the optical-transparent component 100 includes a working region 102, a first calibrating region 104, and a second calibrating region 106. The working region 102 is between the first calibrating region 104 and the second calibrating region 106 and connected thereto, wherein the area of the working region 102 is not only larger than that of the first calibrating region 104 but also larger than that of the second calibrating region 106. In FIG. 6, the optical-transparent component 100 is, for example, of rectangular shape, and has a first axis X and a second axis Y perpendicular to the first axis X, wherein the first calibrating region 104 is arranged at the left side of the working region 102 in the first axis X, and the second calibrating region 106 is arranged at the right side of the working region 102 in the first axis X.

The container filled with the fluid medium 20 for producing the 3D object is arranged at the working region 102. The laser light generated by the laser light generator 120 is a linear light across the working region 102, the first calibrating region 104, and the second calibrating region 106. More particularly, the length of the linear light generated by the laser light generator 120 is at least equal to that of a line connecting the first photodetector 30 and the second photodetector 32 in the first axis X.

Figure 7:
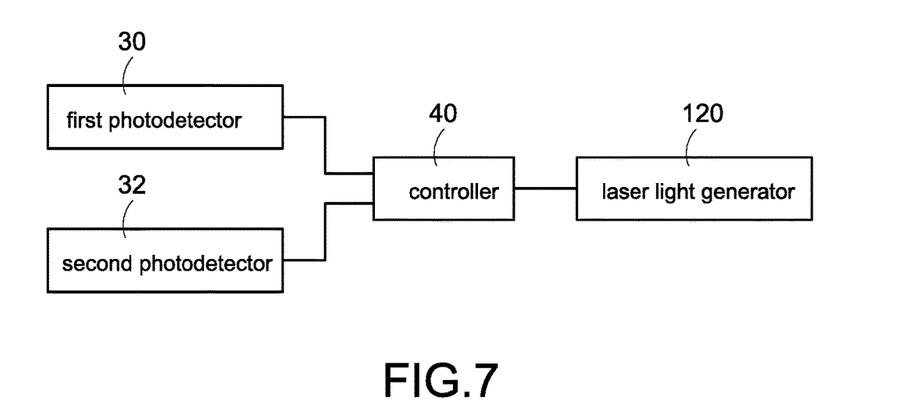
FIG. 7 is a circuit block diagram of the 3D object generating apparatus shown in FIG. 5.

The first photodetector 30 is arranged on the first calibrating region 104, and the second photodetector 32 is arranged in the second calibrating region 106. In particular, the line connecting the first photodetector 30 and the second photodetector 32 is parallel to the first axis X. The first photodetector 30 and the second photodetector 32 are electrically connected to the controller 40, as shown in FIG. 7, and the controller 40 is further electrically connected to the laser light generator 120.

The controller 40 receives a first detecting signal sent from the first photodetector 30 and a second detecting signal sent from the second photodetector 32, and controls the operations of the laser light generator 120 in accordance with the first detecting signal and the second detecting signal. The first photodetector 30 and the second photodetector 32 are, for example, phototransistors, CCDs, and CMOS sensors.

Figure 8:
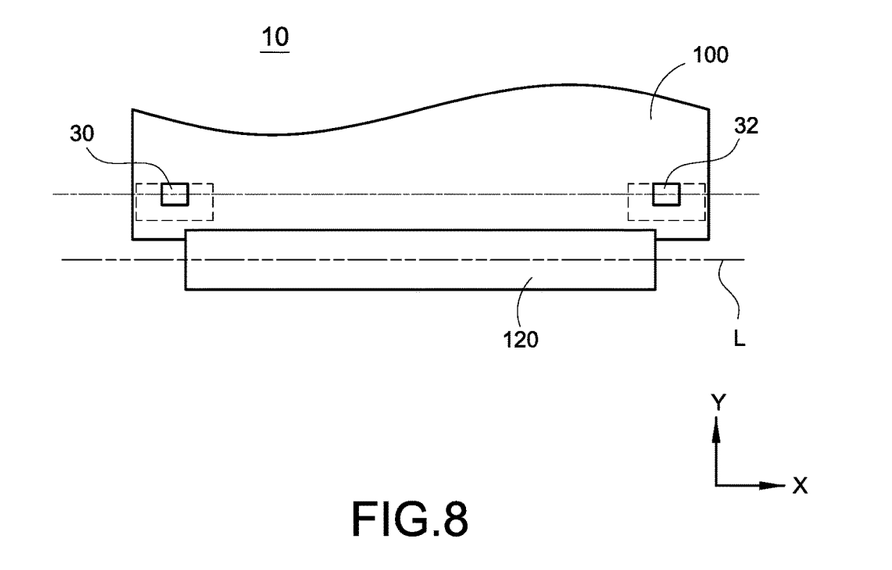
FIG. 8 is a top view of a part of components of the 3D object generating apparatus according to the third embodiment of the present invention.
Figure 9:
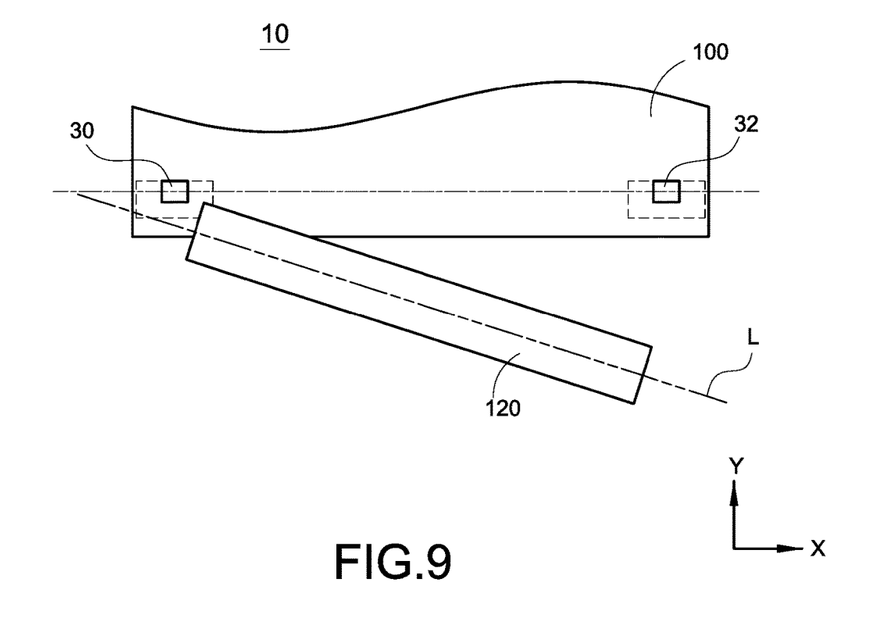
FIG. 9 is another top view of a part of components of the 3D object generating apparatus according to the third embodiment of the present invention.

In normal condition, the linear light L generated by the laser light generator 120 is parallel to the first axis X, as shown in FIG. 8, and the linear light L can be simultaneously detected by the first photodetector 30 and the second photodetector 32. In the other words, when the first photodetector 30 and the second photodetector 32 cannot simultaneously detect the linear light L generated by the laser light generator 120 (as shown in FIG. 9), the linear light L is not parallel to the first axis X because the position of the laser light generator 120 is tilted, and therefore the 3D object generating apparatus 10 cannot generate the 3D object in accordance with the 3D model information precisely.

The following calibrating procedure is employed for calibrating the position of the laser light generator 120 to overcome the problem that the linear light L generated by the laser light generator 120 is not parallel to the first axis X (or called is tilted) and the 3D object generating apparatus 10 cannot generate the 3D object in accordance with the 3D model information precisely.

Figure 10:
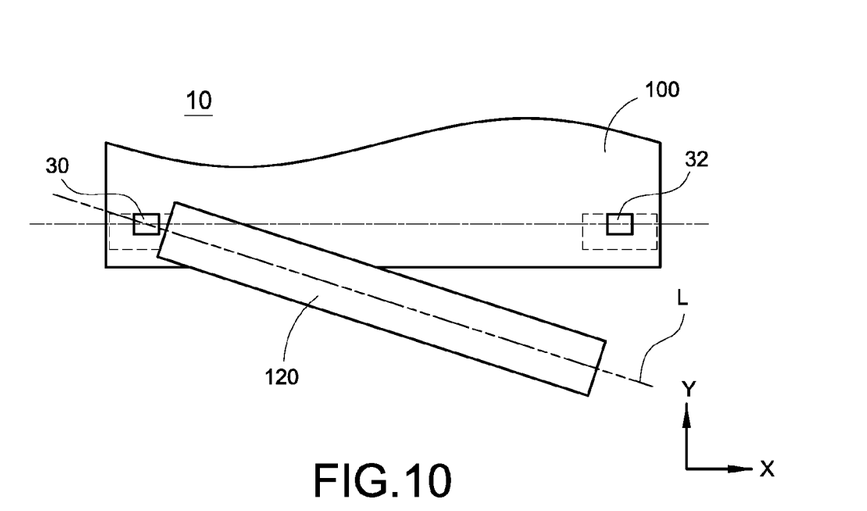
FIG. 10 is an operation diagram of the 3D object generating apparatus according to the third embodiment of the present invention.

At first, the controller 40 makes the laser light generator 120 to generate the linear light L. The length of the linear light L is not smaller than that of the line connecting to the first photodetector 30 and the second photodetector 32. After that, the controller 40 makes the laser light generator 120 move along the second axis Y until the linear light L reaches at least one of the first photodetector 30 and the second photodetector 32 (as shown in FIG. 10). At this time, the positon of the laser light generator 120 is not tilted while the first photodetector 30 and the second photodetector 32 simultaneously detect the linear light L, and the scanning procedure is completed, and the 3D object generating procedure can be performed.

However, the position of the laser light generator 120 is tilted in the second axis when the first photodetector 30 and the second photodetector 40 cannot simultaneously detect linear light L. As can be seen in FIG. 10, the linear light L only reaches the first photodetector 30. After that, the controller 40 must make the laser light generator 120 continuously move along the Y axis until the linear light L reaches the second photodetector 32 (as shown in FIG. 11).

Figure 12:
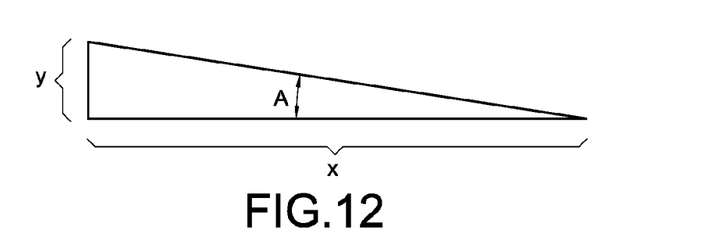

By calculating the moved distance between the linear light reached the first photodetector 30 and the second photodetector 32 in the Y axis, an inclination (or called the tilted angle) can be obtained by the controller 40. Reference is made to FIG. 12, when the inclination of the laser light generator 120 is A, a distance between the first photodetector 30 and the second photodetector 32 in the first axis is x, and a moved distance of the laser light generator 120 in the second axis is y, the following condition is satisfied:

$A = \tan-1(x/y)$.

Figure 11:
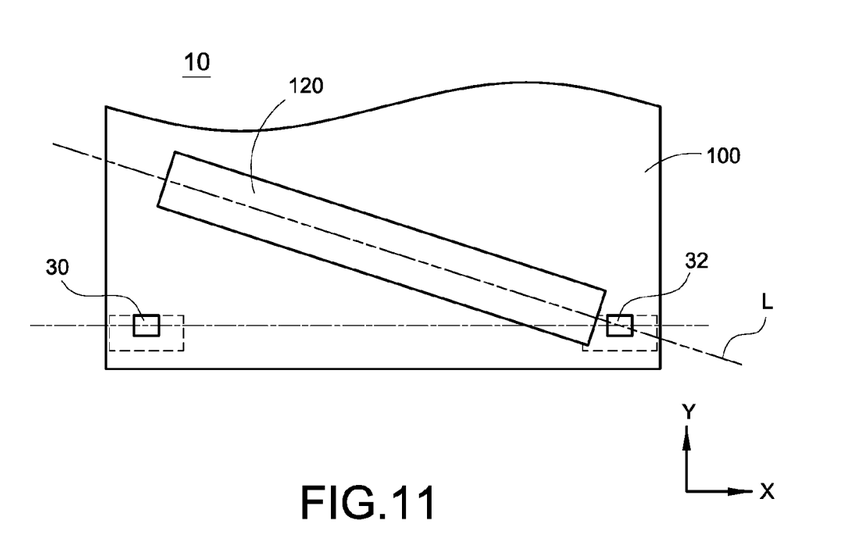
FIG. 11 is an operational diagram of the 3D object generating apparatus according to the third embodiment of the present invention.

In order to calibrate the position of the laser light generator 120 shown in FIG. 11 with the left side tilted upwards, the controller 40 makes the left side of the laser light generator 120 move downwards with the inclination. After that, the linear light L generated by the laser light generator 120 can be parallel to the first axis A.

Thereafter, the 3D object generating apparatus 10 can perform the 3D object generating procedure. However, the 3D object generating apparatus 10 can perform the scanning procedure for the second time to make sure that the first photodetector 30 and the second photodetector 32 can simultaneously detect the linear light L before performing the 3D object generating procedure.

In should be noted that the first photodetector 30 and the second photodetector 32 cannot be limited to be arranged on the optical-transparent component 100. As can be shown in FIG. 13, the first photodetector 30 and the second photodetector 32 are mounted on the housing 130 of the 3D object generating apparatus 10, wherein FIG. 13 is a schematic view of a part of components of a 3D object generating apparatus according to a fourth embodiment of the present invention.

Figure 13:
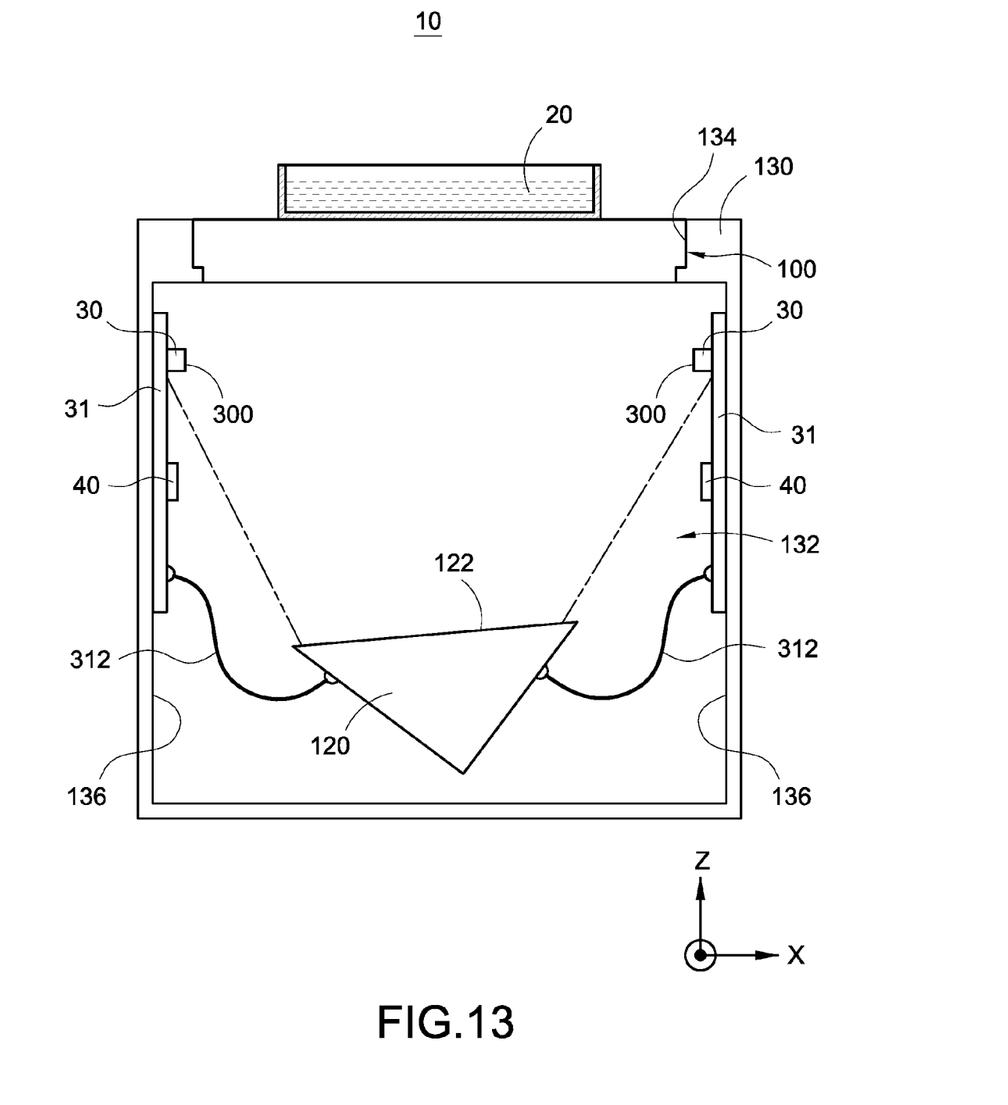
FIG. 13 is a schematic view of a part of components of a 3D object generating apparatus according to a fourth embodiment of the present invention.

In the FIG. 13, the first photodetector 30 and the second photodetector 32 are mounted on a circuit board 31 arranged on an inner surface of the housing 130. The circuit board is close to the optical-transparent component 100, and the first photodetector 30 and the second photodetector 32 face each other. More particularly, a line connecting to first photodetector 30 and the second photodetector 32 is parallel to the first axis X and has the same horizontal level in the third axis Z. Besides, an emitting angle of the linear light L simultaneously covers the first photodetector 30 and the second photodetector 32, thus the scanning procedure same as that mentioned in the third embodiment can be performed to calibrate whether the laser light generator 120 has the inclination or not, and the controller 40 can calibrate the laser light generator 120 while the inclination exists.

Figure 14:
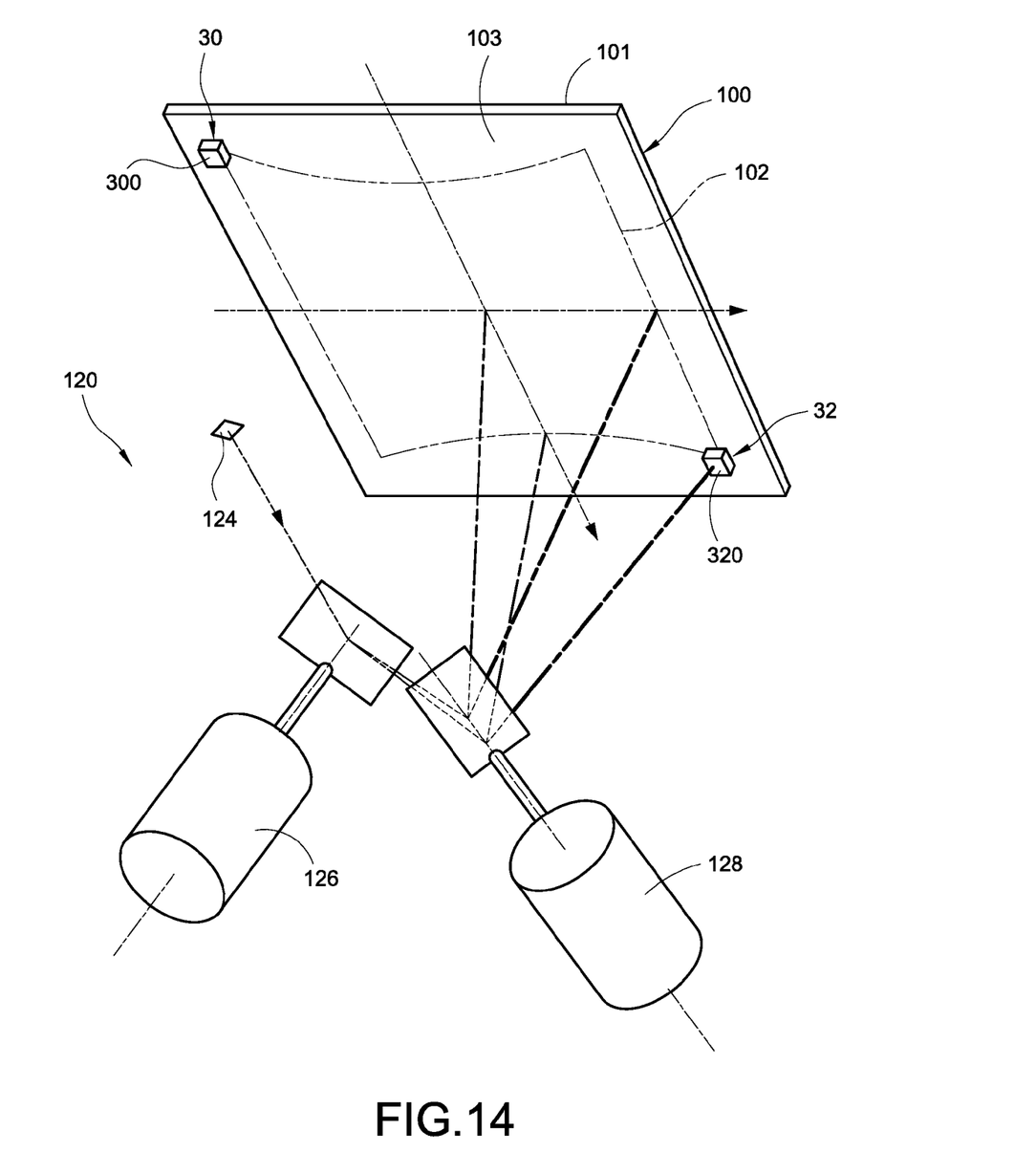
FIG. 14 is a schematic view of a part of components of a 3D object generating apparatus according to a fifth embodiment of the present invention.

Reference is made to FIG. 14, which is a schematic view of a 3D object generating apparatus according to the first embodiment of the present invention. In FIG. 14, the 3D object generating apparatus 10 includes an optical-transparent component 100 and a laser light generator 120. The optical-transparent component 100 includes a first surface 101 and a second surface 103 opposite to the first surface 101. A container (not shown) filled with a fluid medium (not shown) for producing the 3D object are arranged on the first surface 103 of the optical-transparent component 100, and the spot beam of the laser light generated by the laser light enters the fluid medium via the second surface 103 of the optical-transparent component 100. The 3D object generating apparatus 10 may further include an input unit (not shown) for receiving the 3D model information defining the 3D object, and the 3D object is generated within the fluid medium which is selectively cured by spot beam of laser light emitted from the laser light generator 120 brought to selective focus prescribed by the 3D model information.

Figure 15:
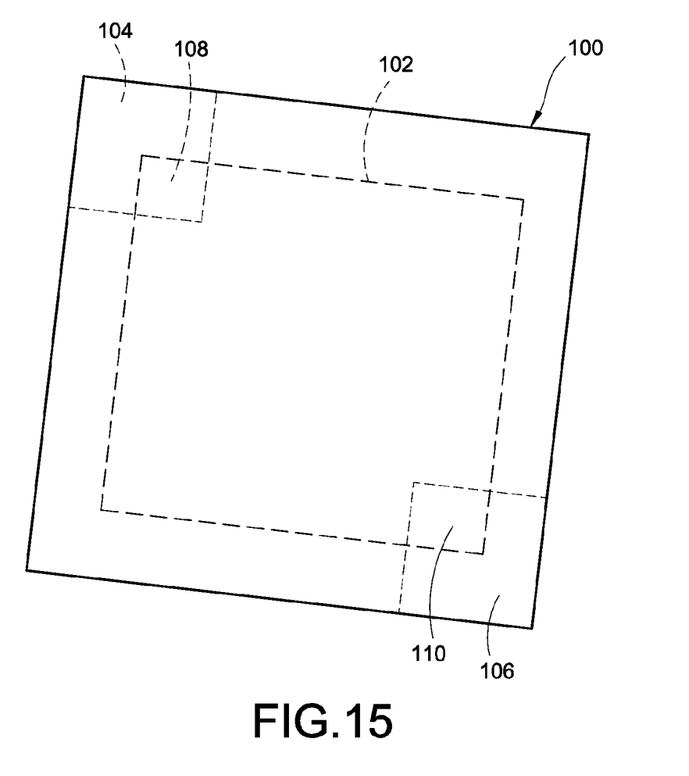
FIG. 15 is a top view of the optical transparent component shown in the FIG. 14.

In FIG. 15, the optical-transparent component 100 includes a working region 102, a first calibrating region 104, and a second calibrating region 106, and the fluid maternal 20 is arranged on the working region 102. The first calibrating region 102 and the second calibrating region 106 are arranged along a diagonal of the working region 102, the first calibrating region 104 and the working region 102 overlap to define a first overlapping region 108, and the second calibrating region 106 and the working region 102 overlap to define a second overlap region 110.

Reference is made to FIG. 14, the laser light generator 120 includes a light emitter 124, a first scanning mirror 126, and a second scanning mirror 128. The light emitter 124 is, for example, laser diode, and is configured to generate light for curing the fluid medium. In the optical path view, the first scanning mirror 126 and the second scanning mirror 128 are arranged between the laser light generator 120 and the optical-transparent component 100, and the scanning direction of the first scanning mirror 126 is parallel to the second scanning mirror 128. More particularly, the first scanning mirror 126 is close to the light emitter 122 for expanding the spot beam generated by the light emitter 122 to the linear beam, the second scanning mirror 128 is close to the optical-transparent component 100 for expanding the linear beam generated by the light emitted 122 and expanded by the first scanning mirror 126 to the surface beam and then projected to the optical-transparent component 100.

A first photodetector 30 and a second photodetector 32 are arranged on the optical-transparent component 100, and the first photodetector 30, the second photodetector 32, and the laser light generator 120 are arranged at the same side of the optical-transparent component 100. The first photodetector 30 is in the first overlapping region 108, the second photodetector 32 is in the second overlapping region 110, and detecting surface 300, 320 of the first photodetector 30 and a second photodetector 32 face the laser light generator 120.

Figure 16:
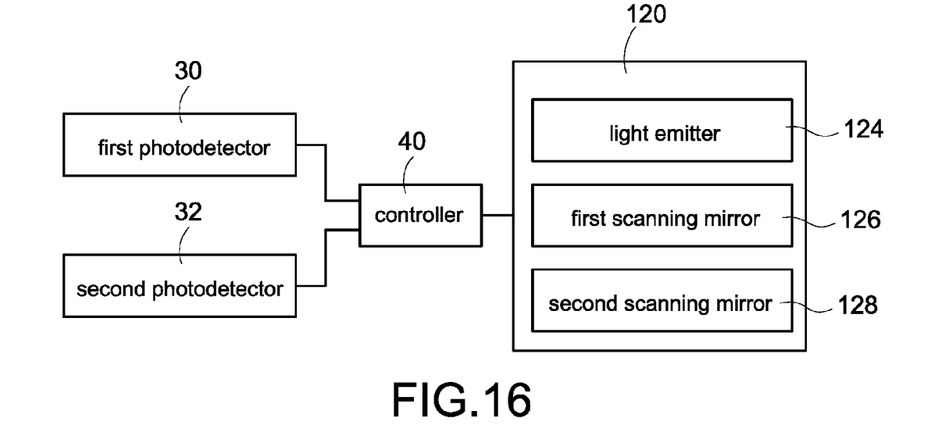
FIG. 16 is a circuit block diagram of the 3D object generating apparatus shown in FIG. 14.

The first photodetector 30 and the second photodetector 32 are electrically connected to the controller 40, as shown in FIG. 16. The controller 40 is further electrically connected to the light emitter 124, the first scanning mirror 126, and the second scanning mirror 128. The controller 40 receives the first signal sent from the first photodetector 20 and the second signal sent from the second photodetector 30 and controls the operations of the first scanning mirror 126 and the second scanning mirror 128 according to the first signal and the second signal, thus the position of the surface beam projected to the optical-transparent component 100 can be controlled.

In normal condition, the surface beam generated by the laser light generator 120 is projected into the working region 102 for curing the fluid medium. However, in abnormal condition, the 3D object generate by the 3D object generating apparatus 10 in accordance with the 3D model information is inaccurate since the surface beam generated by the laser light generator 120 is tilted and not completely projected to the working region, as shown in FIG. 17.

The following calibrating procedure is employed for calibrating the position of the first scanning mirror 126 and the second scanning mirror 128 to overcome the problem that the position of surface beam cannot reach the working region 102 and the 3D object generating apparatus 10 cannot generate the 3D object in accordance with the 3D model information precisely.

Figure 17:
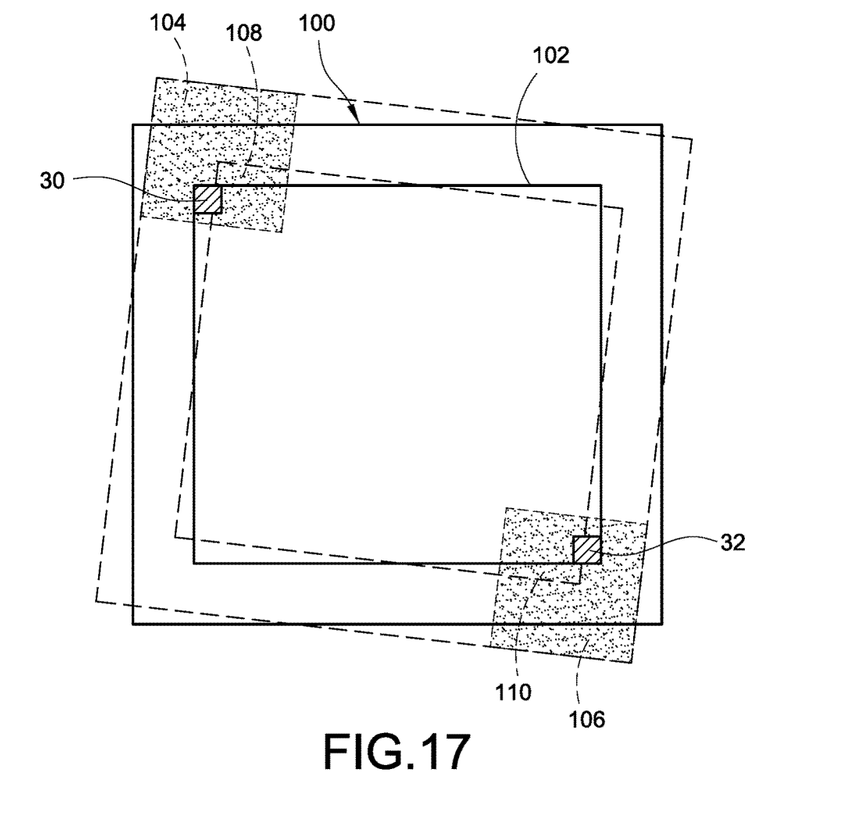
FIG. 17 is a schematic view of a projected image and a laser light projected image according to the fifth embodiment of the present invention.

Reference is made to FIG. 14 and FIG. 17, the calibrating procedure starts with driving the laser light generator 120 to generate the surface beam by a controller 40. The controller 40 further drives the laser light generator 120 to perform the scanning procedure by positioning the surface beam generated by the laser light generator 120 across the first calibrating region 104 of the optical-transparent component 100, and receives the first signal in accordance with the radiant intensity of the surface beam sent from the first photodetector.

Figure 18:
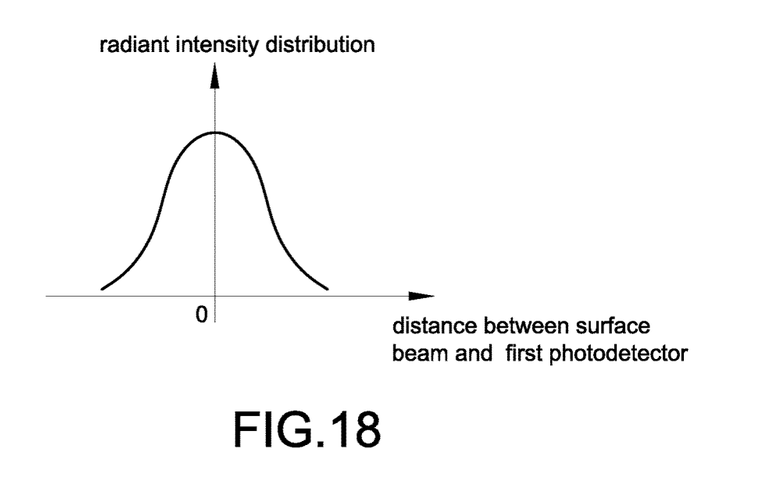
FIG. 18 is a graph of relative radiant intensity distribution of the surface beam reaching the first photodetector.

Reference is made to FIG. 18, which is a graph of relative radiant intensity distribution of the surface beam reaching the first photodetector. As can be seen in FIG. 18, when the surface beam projected to the first overlapping region 108 is directly injected into the first photodetector 30 (when an axis of the surface beam is aligned with the axis of the first photodetector 30 or the distance between the optical axes of the surface beam and the first photodetector 30 is zero), the highest radian intensity is obtained by the first photodetector 30, and when the distance between the optical axes of the surface beam and the first photodetector 30 is increased, the radian intensity obtained by the first photodetector 30 is decreased. Thus, the position of the first photodetector 30 arranged on the optical-transparent component 100 can be obtained according to the peak value of the first signal.

Thereafter, the controller 40 makes the surface beam of the laser light generated by the laser light generator 120 be projected to the second calibrating region 106 and performs scanning procedure within the second calibrating region 106. Thus, the position of the second photodetector 32 arranged on the optical-transparent component 100 can be obtained according to the peak value of the second signal representing the radial intensities during the surface beam calibrating in the second calibrating region 106.

The controller 40 can make the first scanning mirror 126 and/or the second scanning mirror 128 change the scanning angle(s) after obtaining the positions of the first photodetector 30 and the second photodetector 32 according to the first signal and the second signal, thus the surface beam of the laser light generated by the laser light generator 120 can be precisely projected to the working region 102.

Thereafter, the 3D object generating apparatus 10 can perform the 3D object generating procedure. However, the 3D object generating apparatus 10 can perform the scanning procedure for the second time to make sure the surface beam generated by the laser light generator 120 is precisely projected to the working region 102.

In should be noted that the first photodetector 30 and the second photodetector 32 cannot be limited to be arranged on the optical-transparent component 100. As can be shown in FIG. 19, the first photodetector 30 and the second photodetector 32 are arranged on the housing 130 of the 3D object generating apparatus 10, wherein FIG. 19 is a schematic view of a part of components of a 3D object generating apparatus according to a fourth embodiment of the present invention.

Figure 19:
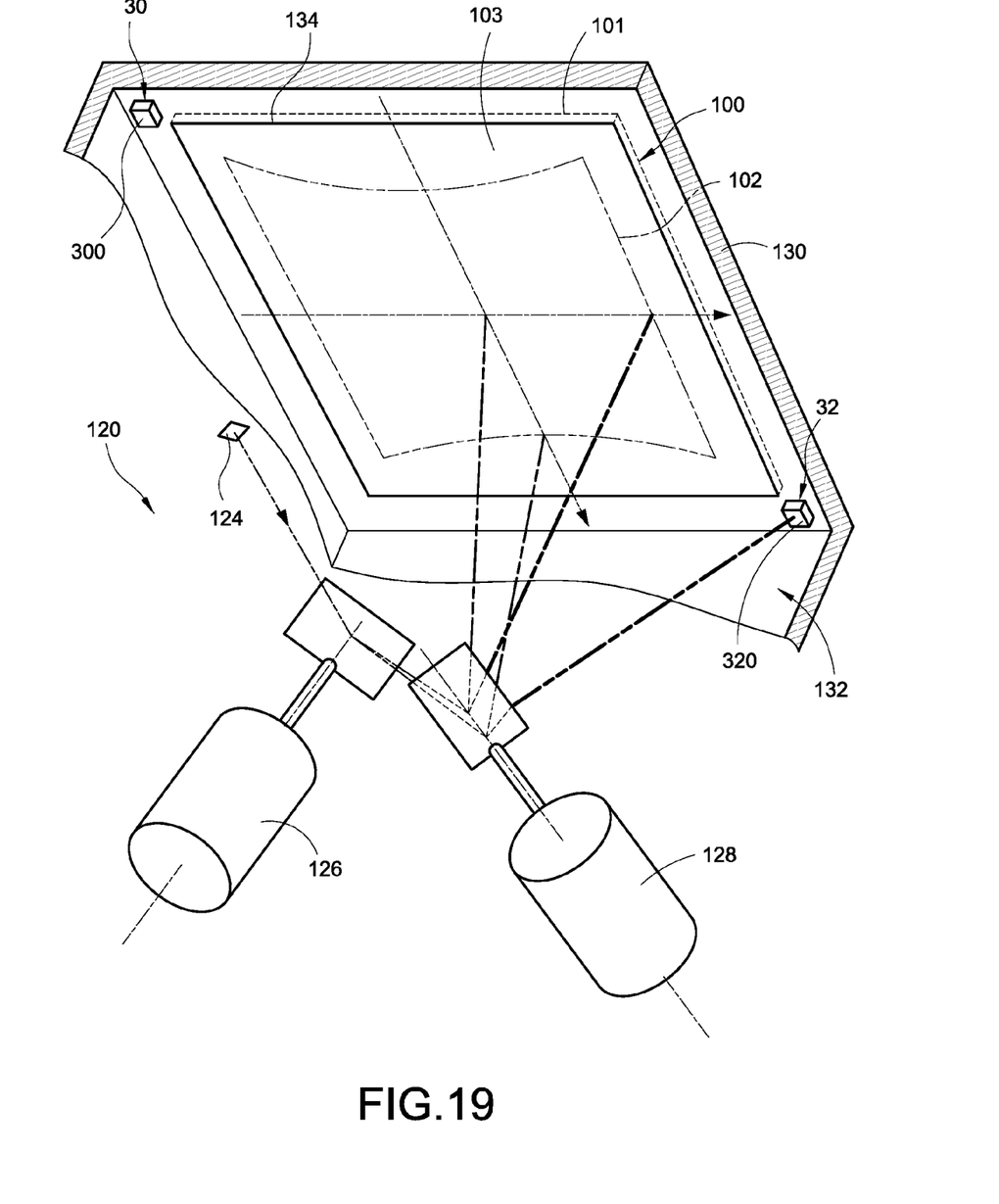
FIG. 19 is a schematic view of a part of components of a 3D object generating apparatus according to a sixth embodiment of the present invention.

In the FIG. 19, the 3D object generating apparatus includes an optical-transparent component 100, a laser light generator 120, and a housing 130. The housing 130 includes an accommodating space 132 and an opening 134 communicating with the accommodating space 132. The optical-transparent component 100 is arranged on the opening 134, the laser light generator 120 is arranged within the accommodating space 132, and the first photodetector 30 and the second photodetector 32 are arranged on an inner surface 136 of the housing 130, wherein the inner surface 136 is, for example, connected to the optical-transparent component 100.

The line for connecting the first photodetector 30 and the second photodetector 32 is parallel to the diagonal of the optical-transparent component 100. When the scanning procedure is performed, the controller 40 makes the laser light generator 120 generate the surface beam for obtaining the positions of the first photodetector 30 and the second photodetector 32, and then makes the first scanning mirror 126 and the second scanning mirror 128 adjust rotating angle when the surface beam is not precisely projected to the working region 102. After that, the surface beam generated by the laser light generator 120 can be precisely projected to the working region.

Thereafter, the 3D object generating apparatus 10 can perform the 3D object generating procedure. However, the 3D object generating apparatus 10 can perform the scanning procedure for the second time to make sure that the surface beam generated by the laser light generator 120 is precisely projected to the working region 102.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A method for calibrating a light of a three-dimensional (3D) object generating apparatus adapted to a 3D object generating apparatus comprising a housing, an optical-transparent component, and a laser light generator, the housing comprising an accommodating space and an opening communicating with the accommodating space, the optical-transparent component arranged on the opening, the laser light generator is arranged on one side of the optical-transparent component and located within the accommodating space, and is used for curing a fluid medium arranged on the other side of the optical-transparent component and in a working region, the method comprising:
providing a first photodetector and a controller, wherein the controller is electrically connected to the first photodetector and the laser light generator;
using the controller to drive the laser light generator to generate the light and perform a scanning procedure; and
stopping the scanning procedure when the first photodetector detects the light generated by the laser light generator, wherein the first photodetector is arranged corresponding to a first light calibration region adjacent to the working region, and then performing a 3D object generating procedure in the working region by moving the laser light generator toward the working region with a preset distance;

wherein the first photodetector and the laser light generator are arranged at the same side of the optical-transparent component;

wherein the preset distance is equal to or larger than a distance between a central axis of the first photodetector and an interface between the first light calibration region and the working region.

2. The method in claim 1, wherein the first photodetector comprising a detecting surface is arranged in the first light calibration region, and the detecting surface faces a light emitting surface of the laser light generator.

3. The method in claim 2, wherein the first calibrating region and the working region are arranged in a first axis, the preset distance is equal to or larger than a distance between the central axis of the first photodetector and the working region in the first axis.

4. The method in claim 3, wherein the scanning procedure is performed in the first calibrating region.

5. The method in claim 1, wherein the first photodetector is arranged on the housing.

\* \* \* \* \*